United States Patent [19]
Boice

[11] Patent Number: 5,205,238
[45] Date of Patent: Apr. 27, 1993

[54] METHOD AND APPARATUS FOR INDUCING CONTROLLED STRESSED BEHAVIOR IN ANIMALS, SUCH AS ENHANCED EATING, DRINKING, MATING, MATERNAL OR THE LIKE BEHAVIOR

[76] Inventor: Harry E. Boice, 15811 Hunton La., Haymarket, Va. 22069

[21] Appl. No.: 722,292

[22] Filed: Jun. 27, 1991

[51] Int. Cl.[5] .......................................... A01K 29/00
[52] U.S. Cl. ..................................... 119/29; 119/174
[58] Field of Search ................. 119/29, 105, 106, 174; 54/71, 78; 128/419 S

[56] References Cited

U.S. PATENT DOCUMENTS

| | | | |
|---|---|---|---|
| 1,926,291 | 9/1933 | Kruse | 119/105 |
| 2,623,498 | 12/1952 | Gustavsson | 119/29 |
| 2,757,637 | 8/1956 | Fischer | 119/105 |
| 2,837,056 | 6/1958 | Kanta | 119/29 |
| 3,733,530 | 5/1973 | Labart et al. | 119/29 |
| 3,827,403 | 8/1974 | Meyer | 119/29 |
| 4,124,028 | 11/1978 | Gallo | 128/419 S |
| 4,335,682 | 6/1982 | Gonda et al. | 119/29 |
| 4,539,937 | 9/1985 | Workman | 119/29 |
| 4,898,119 | 2/1990 | Tsai | 119/29 |
| 4,919,082 | 4/1990 | Tsai | 119/29 |

FOREIGN PATENT DOCUMENTS 3610960 10/1987 Fed. Rep. of Germany ........ 119/29

OTHER PUBLICATIONS

Offner Electronics Inc., "Brief Stimulus Apparatus".
Science, Aug. 1975, vol. 189, pp. 731-733 Seymour M. Antelman and Henry Szechtman.
Current Medical Research and Opinion, vol. 6, Suppl. 1, 1979, pp. 73-82, Antelman, Caggiula, Eichler and Lucik.

Primary Examiner—John G. Weiss
Attorney, Agent, or Firm—Frank P. Presta

[57] ABSTRACT

A pressure-applying apparatus and method for using the apparatus to induce controlled stressed behavior in animals, such as enhanced eating, drinking, mating, or the like behavior. The apparatus includes a mechanism for mounting the apparatus on a body part of the animal, a mechanism for applying variable stress to the body part, and a device for automatically controlling the variation of stress. The method includes the steps of mounting a stress-applying apparatus on a body part of an animal, and actuating the stress applying apparatus to apply variable stress to the body part over time in a predetermined manner.

24 Claims, 1 Drawing Sheet

METHOD AND APPARATUS FOR INDUCING CONTROLLED STRESSED BEHAVIOR IN ANIMALS, SUCH AS ENHANCED EATING, DRINKING, MATING, MATERNAL OR THE LIKE BEHAVIOR

BACKGROUND OF THE INVENTION

The present invention relates to a method and apparatus for inducing controlled stressed behavior in animals, such as enhanced eating, drinking, mating, maternal or the like behaviors.

It is well known that when an animal is subject to a stressful condition, the animal will attempt to behave in a way which will alleviate the stress. Studies have indicated that a number of specific behaviors such as eating, drinking, mating, and maternal behaviors tend to reduce stress in animals, and that a stressed animal will partake in one or more of these behaviors depending on which behaviors are made available. It is important to understand that these stress reducing behaviors are not learned behaviors but appear to be inherent to all animals. As a result, a number of specific behaviors can be predictably induced in a stressed animal. For example, an animal which would not normally be eating could be induced to eat by subjecting the animal to stress and making food available. Therefore, a need has been created for an effective and economical means for inducing stressed behavior in animals.

The present invention was developed to address this need by providing an effective and economical method and apparatus for inducing controlled stressed behavior in animals.

BRIEF DESCRIPTION OF THE PRIOR ART

A variety of animal training devices are known in the patented prior art which are capable of inflicting a painful stimulation to punish the animal in order to teach the animal to behave in a desired manner. Such devices have proved to be effective in training an animal when used over an extended period of time, because the animal will learn how to avoid the painful stimulation by behaving accordingly. These training devices are capable of causing an animal to adopt a learned behavior, but do not provide a means for inducing a stressed behavior, such as enhanced eating, drinking, mating, maternal or the like behavior, by applying a non-painful stimulation.

Studies have been performed in which a non-painful stress inducing stimulation has been applied to animals in order to observe their behavior. In one of these studies, a surgical hemostat was chronically applied to the tail of a rat causing non-painful pressure to induced stress related enhanced eating, drinking, mating and maternal behavior. These studies demonstrate that stressed behavior can be predictably induced in animals by the chronic application of pressure to the animals tail, but they do not provide an effective and economical method or apparatus for inducing stressed behavior in animals, particularly for inducing stressed behavior in a large number of animals over an extended period of time.

SUMMARY OF THE INVENTION

Accordingly, it is a primary object of the present invention to provide a pressure-applying apparatus for inducing controlled stressed behavior in animals, such as enhanced eating, drinking, mating, maternal or the like behaviors. The apparatus includes a means for mounting the apparatus on a body part of the animal, a means for applying variable pressure to the body part, and a means for automatically controlling the variation of the pressure.

According to a more particular object of the invention, the means for automatically controlling the variation of pressure includes an electronic timing circuit which is programmable to enable selective control over the variation of pressure.

A further object of the invention is to provide a timing circuit which is programmed to randomly vary the pressure over time.

Another object of the invention is to provide a method of using a pressure-applying apparatus to induce controlled stressed behavior in animals, such as enhanced eating, drinking, mating, maternal or the like behavior. In accordance with the method, a pressure applying apparatus is mounted on a body part of the animal which is capable of applying variable pressure to a body part, then the pressure-applying apparatus is activated to automatically apply variable pressure to the body part. More particularly, the method includes the step of selectively programming the pressure applying apparatus to selectively control the variation of pressure over time.

Yet another object of the invention is to provide a method of inducing controlled stressed behavior in a plurality of animals using a plurality of pressure applying apparatuses. The method includes the steps of mounting a plurality of pressure-applying apparatuses on a body part of a plurality of animals, and activating the pressure-applying apparatuses to automatically apply variable pressure to the body part of each of the plurality of animals. More particularly, the method includes using a remote transmitter, remote from the pressure applying apparatuses, for selectively controlling the variation of pressure over time by each of the pressure applying apparatuses.

BRIEF DESCRIPTION OF THE FIGURES

Other objects and advantages of the subject invention will become apparent from a study of the following specification when viewed in the light of the accompanying drawing, in which.

DETAILED DESCRIPTION

Figure 1:
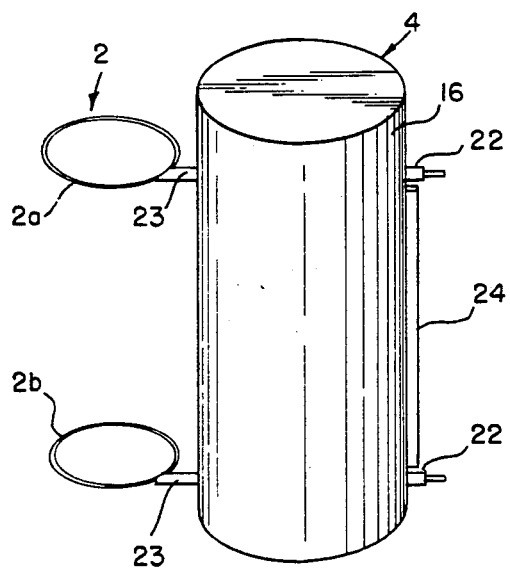
FIG. 1 is a side perspective view of one embodiment of the pressure-applying apparatus.
Figure 2:
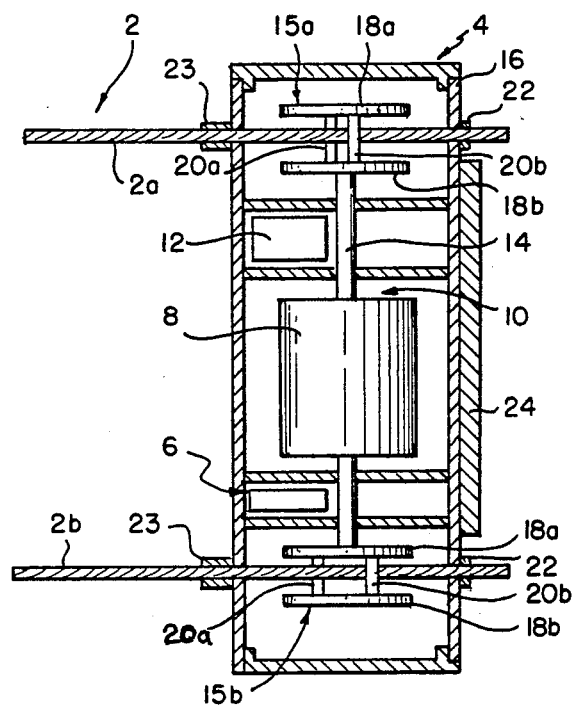
FIG. 2 is a cross-sectional view of the apparatus of FIG. 1.
Figure 4:
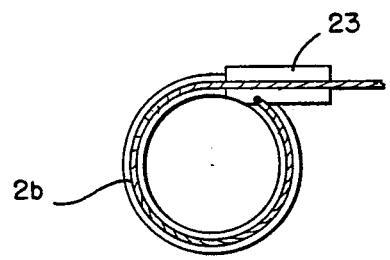
FIG. 4 is a cross-sectional view of the strap-type member of FIG. 2.

Referring to FIGS. 1, 2 and 4, there is shown a preferred embodiment of the pressure-applying apparatus of the present invention. The pressure applying apparatus includes a means 2 for mounting the apparatus on a body part of an animal (not shown), means 4 operatively associated with the mounting means 2 for applying variable pressure to the body part, and means 6 operatively connected with the pressure-applying means 4 for automatically controlling the variation of the pressure. The pressure-applying apparatus should be operable to apply a non-painful, non-localized sensation to the body part of the animal, thereby inducing stressed behavior in the animal.

The mounting means 2 is provided as a pair of strap-type members 2a and 2b, each being constructed to form a loop around the body part. The pressure applying means 4 preferably includes an electric motor 8, means 10 driven by the motor 8 for increasing and decreasing the amount of pressure applied to the body section, and a power supply 12, such as a battery, for powering the motor 8. The driven means 10 preferably includes a driven shaft 14, and pair of strap take-up members 15a and 15b constructed to co-operate with the strap-type members 2a and 2b for increasing and decreasing the size of the loops formed thereby. Each of the strap take-up members 15a and 15b preferably includes a pair of plates 18a and 18b, and a pair of cross bars 20a and 20b.

A housing 16 is provided for housing the motor 8, the driven means 10, and the pressure control means 6. The strap-type members, 2a and 2b each form a loop adjacent to the housing 16, and have one end which extends through one side of the housing 16, between the cross bars 20a and 20b, and out the opposite side of the housing 16. By positioning the end of the strap-type member between the cross bars 20a and 20b, the end will be wound around the take-up member when driven by the motor 8. A stop member 22 is mounted on the end of the strap-type member which extends out of the housing for preventing pulling the end back through the housing, and for allowing the strap-type member to be manually pulled up to a base pressure around the body part when the apparatus is mounted thereon. Preferably, the take-up members 15a and 15b are aligned such that the pressure created by strap-type member 2a is increased while the pressure created by strap-type member 2b is decreased. Preferably, a sliding loop forming member 23 is secured to one end of the strap-type members 2a and 2b, and is in sliding engagement with the mid-portion thereof, thereby enabling the loops formed by the strap-type members 2a and 2b to be increased and decreased in size while applying equal pressure to the body part at all points around the loop.

The pressure control means 6 preferably includes an electronic timing circuit, such as a microprocessor, which is capable of automatically controlling the variation of pressure. Preferably, the circuit is programmable to enable selective control over the variation of the pressure. The timing circuit may be programmed to randomly vary the pressure over time so that the animal does not become familiar with and therefore anticipate the application of pressure, which would decrease the effectiveness of the apparatus. In particular, the device may be programmed to continually increase the pressure to a first pressure, of sufficient magnitude to cause a mild non-localized sensation in the body part resulting in the animal exhibiting stressed behavior, maintain the pressure for a first period of time, decrease the pressure back to a second base pressure, again resulting in a stressed response, and maintain the second pressure for a second period of time. The circuit should be capable of selectively varying the lengths of the first and second periods of time and/or the first and second pressures.

Preferably, the apparatus further includes photoelectric panel means 24, such as an array of photoelectric cells, for converting light to electricity for recharging the power supply 12.

In addition, the mounting means 2 is constructed for securely mounting the apparatus on the tail section of an animal. Preferably, the mounting means 2 is shielded as shown in FIG. 4 to prevent rubbing and irritation to the animal.

Figure 3:
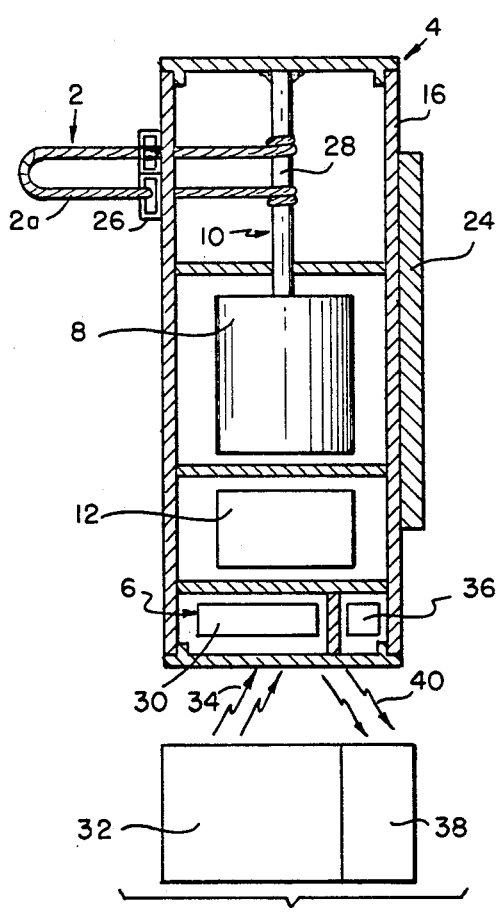
FIG. 3 is a cross-sectional view of an alternative embodiment of the pressure-applying apparatus.
Figure 5:
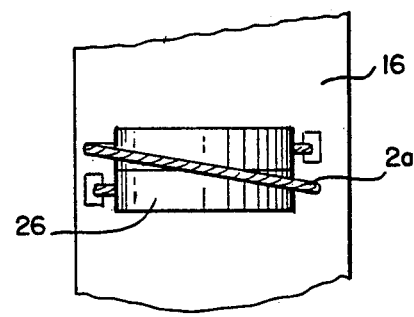
FIG. 5 is a front view of the offsetting member of FIG. 3 with parts broken away.

Referring now to FIGS. 3 and 5, there is shown an alternative embodiment of the pressure-applying apparatus including means 2 for mounting the apparatus on a body part of the animal (not shown), means 4 for applying variable pressure to the body part, and means 6 for controlling the variation of the pressure. The pressure applying means 4 includes an electric motor 8, driven means 10 for increasing and decreasing the pressure applied to the body part, and power supply 12 for powering the motor. A photoelectric panel means 24 is mounted on housing 16 for recharging the power supply 12. Body mounting means 2 is provided as a strap-type member 2a forming a loop adjacent to the housing for extending around the body part (not shown). The strap-type member is fed through an offset member 26, into the housing 16, and around strap take-up member 28. The offsetting member 26 is provided to offset the loop formed by the strap-type member 2a such that the loop forms a spiral loop around the body part, thereby reducing irritation or painful pinching of the body part.

The pressure control means 6 includes a programmable timing circuit 30 for enabling the timing circuit 30 to be selectively programmed to automatically control the variation of pressure applied to the body part. The pressure control means 6 further includes a remote transmitter 32 for remotely sending selected programming signals 34, and a receiver 36 for receiving the programming signals 34 and selectively programming the timing circuit 30, therewith. The control means 6 may also include a transmitter (not shown) positioned in the housing 16 and operatively associated with the timing circuit 30 and/or the pressure applying means 4 for transmitting status information 40, and a remote receiver (38) for receiving the status information therefrom. The status information may include the amount of pressure being applied, current timing information, power supply information, or any other relevant operating parameters.

By providing a pressure-applying apparatus which is operable to apply variable pressure to the body part of an animal, mounting the apparatus on the body part of the animal, and actuating the apparatus to automatically apply variable pressure to the body part over time, a desired stressed behavior can be reliably and economically induced in the animal. By programming the apparatus to selectively apply pressure in a desired manner, the apparatus can be effectively used to induce stress at desired times for inducing a desired stressed response. In addition, the apparatus may be programmed such that the animal does not become familiar with the operation of the apparatus, and therefore begin to anticipate the impending pressure, which would decrease the effectiveness of the apparatus. By programming the apparatus to randomly change the operating parameters, such as the amount of pressure or time of pressure, stressed behavior can be effectively induced in the animal over a long period of time.

A plurality of pressure-applying apparatuses may be used to effectively and economically induce stress in a plurality of animals by mounting a plurality of pressure-applying apparatuses on a plurality of animals, respectively, and actuating the apparatuses to automatically apply variable pressure to the body part of each of the plurality of animals. A remote transmitter may be used to remotely control a single or a plurality of apparatuses to apply pressure in a desired manner to one or more of the animals. A remote receiver may be used to remotely monitor the operation of a single or a plurality of apparatuses.

The method and apparatus of the present invention can be used to reliably and economically induce a number of desirable behaviors in a single or a group of animals. For example, stressed behavior could be induced in an entire herd of cattle to cause them to eat more than they normally would, thereby gaining weight faster. Animals could also be induced to eat foods they would not normally eat, such as cheaper synthetic foods, thereby reducing the cost of raising animals. In addition, animals could be induced to mate more often to increase reproduction. A female animal's maternal behavior could be enhanced to make her more receptive to nursing.

While in accordance with the patent statute, the preferred forms and embodiments of the invention have been illustrated and described, it will be apparent to those of ordinary skill in the art that various changes and modifications may be made without deviating from the inventive concept set forth above.

What is claimed is:

1. A stress-applying apparatus for inducing controlled stressed behavior in animals, such as increased eating, drinking, mating, maternal or the like behavior, comprising:
   (a) means for mounting said apparatus on a body part of the animal;
   (b) means operatively associated with said body mounting means for applying variable stress to the body part; and
   (c) means operatively connected with said stress-applying means for controlling the variation of said stress over time in a predetermined manner;
   said stress applying means including:
      a motor;
      means driven by said motor for increasing and decreasing the amount of stress applied to the body part; and
      a power supply operatively connected with said motor.

2. Apparatus as defined in claim 1, wherein said body mounting means is constructed to fit on a tail section of the animal.

3. Apparatus as defined in claim 1, and further comprising photoelectric panel means operatively connected with said power supply for recharging said power supply.

4. Apparatus as defined in claim 1, wherein said body mounting means includes a strap-type member which forms a loop around the body part, and further wherein said driven means includes a strap take-up member operable to increase and decrease the size of said loop formed by said strap-type member, thereby, increasing and decreasing the amount of said stress applied to the body part, respectively.

5. Apparatus as defined in claim 4, wherein said body mounting means includes a plurality of strap-type members each forming a loop around the body part, and further wherein said driven means includes a plurality of strap take-up members operable to increase and decrease the size said loops formed by said strap-type members, respectively.

6. Apparatus as defined in claim 4, wherein said body mounting means includes offset means for offsetting the loop formed by said strap-type member to form a spiral loop around the body part.

7. A pressure-applying apparatus for inducing controlled stressed behavior in animals, such as increased eating, drinking, mating, maternal or the like behavior, comprising:
   (a) means for mounting said apparatus on a body part of the animal;
   (b) means operatively associated with said body mounting means for applying variable pressure to the body part to create a non-localized pressure sensation to the animal to induce the stressed behavior; and
   (c) means operatively connected with said pressure-applying means for controlling the variations of said pressure over time in a predetermined manner.

8. Apparatus as defined in claim 7 wherein said body mounting means is constructed to fit on a tail section of the animal.

9. Apparatus as defined in claim 7, wherein said pressure control means includes electronic timing circuit means for automatically controlling the variation of said pressure.

10. Apparatus as defined in claim 9, wherein said timing circuit means is programmable to enable selective control over the variation of said pressure.

11. Apparatus as defined in claim 10, wherein said timing circuit means is programmed to vary said pressure over time.

12. Apparatus as defined in claim 9, wherein said timing circuit means is programmed to continually increase said pressure to a first pressure, maintain said first pressure for a first period of time, decrease said pressure to a second pressure, and maintain said second pressure for a second period of time.

13. Apparatus as defined in claim 12, wherein said timing circuit means is programmable to selectively control the lengths of said first and said second periods of time.

14. Apparatus as defined in claim 12, wherein said timing circuit means is programmable to selectively control the amounts of said first and said second pressures.

15. Apparatus as defined in claim 13, and further wherein said timing circuit means is programmed to periodically change said first and said second periods of time.

16. Apparatus as defined in claim 10, wherein said pressure control means further includes remote transmitter means for remotely sending selected programming signals, and receiving means operatively associated with said timing circuit means for receiving said signals and programming said timing circuit therewith.

17. A method of inducing controlled stressed behavior in animals, such as enhanced eating, drinking, mating, maternal or the like behavior, using a pressure-applying apparatus, comprising the steps of:
   (a) mounting said pressure-applying apparatus on a body part of the animal, said pressure-applying apparatus being operable to apply variable pressure to the body part to create a non-localized pressure sensation to the animal to induce the stressed behavior; and
   (b) programming said pressure-applying apparatus to apply variable pressure to the body part over time in a predetermined manner.

18. A method as defined in claim 17, and further comprising the step of selectively programming said pressure-applying apparatus to selectively control the variation of said pressure over time.

19. A method as defined in claim 17, and further comprising the step of using a remote transmitter remote from said pressure-applying apparatus to selectively control the variation of said pressure over time.

20. A method as defined in claim 18, wherein said programming step includes programming said pressure-applying apparatus to vary said pressure over time.

21. A method of inducing controlled stressed behavior in a plurality of animals, such as enhanced eating, drinking, mating, maternal or the like behavior, using a plurality of pressure-applying apparatuses, comprising the steps of:
 (a) mounting a plurality of pressure-applying apparatuses on a body part of a plurality of animals, respectively, said plurality of pressure-applying apparatuses each being operable to apply variable pressure to the body part of each of said plurality of animals to create a non-localized pressure sensation to each animal to induce the stressed behavior, respectively; and
 (b) programming said plurality of pressure-applying apparatuses to apply variable pressure over time in a predetermined manner to a body part of each of said plurality of animals, respectively.

22. A method as defined in claim 21, and further comprising the step using a remote receiving station remote from each of said pressure-applying apparatuses to receive and collect status information transmitted therefrom.

23. A method as defined in claim 21, and further comprising the step of using a remote transmitter remote from said pressure-applying apparatuses for selectively controlling the variation of said pressure over time by each of said pressure-applying apparatuses.

24. A method as defined in claim 21, and further comprising the step of making a desired stress-relieving behavior available to the animals.

* * * * *